United States Patent
Awano et al.

(10) Patent No.: US 11,472,432 B2
(45) Date of Patent: Oct. 18, 2022

(54) INFORMATION PRESENTATION CONTROL DEVICE, INFORMATION PRESENTATION DEVICE, INFORMATION PRESENTATION CONTROL METHOD, AND NON-TRANSITORY COMPUTER-READABLE RECORDING MEDIUM

(71) Applicant: MITSUBISHI ELECTRIC CORPORATION, Tokyo (JP)

(72) Inventors: Tomoharu Awano, Tokyo (JP); Masaru Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/222,211

(22) Filed: Apr. 5, 2021

(65) Prior Publication Data
US 2021/0221396 A1 Jul. 22, 2021

Related U.S. Application Data
(63) Continuation of application No. PCT/JP2018/043395, filed on Nov. 26, 2018.

(51) Int. Cl.
*B60Q 1/00* (2006.01)
*B60W 50/14* (2020.01)
(Continued)

(52) U.S. Cl.
CPC .............. *B60W 50/14* (2013.01); *B60K 35/00* (2013.01); *B60W 40/08* (2013.01);
(Continued)

(58) Field of Classification Search
CPC ................. B60W 50/14; B60W 40/08; B60W 2540/225; B60W 2540/229;
(Continued)

(56) References Cited

U.S. PATENT DOCUMENTS 6,957,128 B1 * 10/2005 Ito ........................ G08G 1/0962
701/1
9,975,483 B1 * 5/2018 Ramaswamy ......... B60Q 11/00
(Continued)

FOREIGN PATENT DOCUMENTS

| CN | 202389288 U | 8/2012 |
|----|-------------|--------|
| CN | 102754138 A | 10/2012 |

(Continued)

OTHER PUBLICATIONS

International Search Report, issued in PCT/JP2018/043395, PCT/ISA/210, dated Dec. 25, 2018.
(Continued)

*Primary Examiner* — Zhen Y Wu
(74) *Attorney, Agent, or Firm* — Birch, Stewart, Kolasch & Birch, LLP

(57) ABSTRACT

An information presentation control device includes: an analyzer to calculate a degree of risk based on information regarding an object located around a vehicle; an occupant monitor to determine whether a driver is aware of approach of the object, based on information obtained by imaging the driver with a camera; an image processor to cause at least one of the displays to perform alerting display, based on the degree of risk; and a sound processor to cause the sound output device to generate, as an alerting sound, a sound whose sound image is controlled so that a virtual sound source is localized at a position of at least one of the at least one display, based on the degree of risk. When the driver is aware of the object, the sound processor stops generation of the alerting sound or decreases a sound volume of the alerting sound.

20 Claims, 9 Drawing Sheets

US 11,472,432 B2
Page 2

(51) Int. Cl.
*B60K 35/00* (2006.01)
*B60W 40/08* (2012.01)
*G06V 20/59* (2022.01)

(52) U.S. Cl.
CPC ...... *G06V 20/597* (2022.01); *B60K 2370/152* (2019.05); *B60K 2370/157* (2019.05); *B60K 2370/178* (2019.05); *B60K 2370/1868* (2019.05); *B60W 2050/143* (2013.01); *B60W 2050/146* (2013.01); *B60W 2540/225* (2020.02); *B60W 2540/229* (2020.02)

(58) Field of Classification Search
CPC ...... B60W 2050/143; B60W 2050/146; B60K 35/00; B60K 2370/152; B60K 2370/178; B60K 2370/157; B60K 2370/1868; G06K 9/00845
USPC .......................................................... 340/428
See application file for complete search history.

(56) References Cited

U.S. PATENT DOCUMENTS

| | | | | |
|---|---|---|---|---|
| 2010/0060441 | A1* | 3/2010 | Iwamoto | B60W 50/14 340/435 |
| 2012/0242505 | A1 | 9/2012 | Maeda et al. | |
| 2015/0015712 | A1* | 1/2015 | Sempuku | G06V 20/58 348/148 |
| 2015/0310313 | A1 | 10/2015 | Murayama et al. | |
| 2016/0152182 | A1* | 6/2016 | Aoki | G08G 1/166 340/435 |
| 2017/0021768 | A1* | 1/2017 | Jaegal | G06F 3/165 |
| 2017/0174129 | A1* | 6/2017 | Chin | B60W 40/08 |
| 2017/0305342 | A1* | 10/2017 | Tomioka | B60R 1/00 |
| 2017/0368936 | A1* | 12/2017 | Kojima | B60W 30/182 |
| 2018/0012085 | A1* | 1/2018 | Blayvas | G06F 3/017 |
| 2018/0272894 | A1* | 9/2018 | Logan | B60N 2/2863 |
| 2019/0039628 | A1* | 2/2019 | Mizuno | G06V 20/58 |
| 2019/0052967 | A1* | 2/2019 | Kim | B60Q 9/00 |
| 2020/0158868 | A1 | 5/2020 | Ibata et al. | |
| 2020/0377126 | A1 | 12/2020 | Obata et al. | |
| 2021/0150772 | A1* | 5/2021 | Yasui | B60K 35/00 |

FOREIGN PATENT DOCUMENTS

| | | |
|---|---|---|
| CN | 102855774 A | 1/2013 |
| CN | 103204123 A | 7/2013 |
| CN | 106467112 A | 3/2017 |
| EP | 2 541 465 A2 | 1/2013 |
| JP | 11-34773 A | 2/1999 |
| JP | 2000-149167 A | 5/2000 |
| JP | 2001-143191 A | 5/2001 |
| JP | 2012-113672 A | 6/2012 |
| JP | 2013-143744 A | 7/2013 |
| JP | 5745827 B2 | 7/2015 |
| JP | 5930067 B2 | 6/2016 |
| JP | 6289788 B1 | 3/2018 |
| JP | 6381736 B1 | 8/2018 |
| JP | 2018-149894 A | 9/2018 |
| WO | WO 2018/066028 A1 | 4/2018 |

OTHER PUBLICATIONS

Notice of Reasons for Refusal for Japanese Application No. 2019-510722, dated Apr. 9, 2019.
Chinese Office Action and Search Report for Chinese Application No. 201880099030.9, dated Jun. 15, 2022, with English translation of Chinese Office Action.

* cited by examiner

INFORMATION PRESENTATION CONTROL DEVICE, INFORMATION PRESENTATION DEVICE, INFORMATION PRESENTATION CONTROL METHOD, AND NON-TRANSITORY COMPUTER-READABLE RECORDING MEDIUM

CROSS REFERENCE TO RELATED APPLICATION

This application is a continuation of International Application No. PCT/JP2018/043395, filed on Nov. 26, 2018, the disclosure of which is incorporated herein by reference in its entirety.

BACKGROUND OF THE INVENTION

1. Field of the Invention

The present invention relates to an information presentation control device, an information presentation device, an information presentation control method, and a non-transitory computer-readable recording medium.

2. Description of the Related Art

There are known information presentation devices that display information for assisting in driving of vehicles. In recent years, electronification of displays for vehicles has been advancing, and information presentation methods have been diversifying. Examples of displays include electronic instrument panels, head-up displays, and electronic mirrors. The use of these displays makes it possible to provide drivers with information required for driving in an easy-to-view and easy-to-understand manner. The information required for driving described here includes images representing approaching other vehicles. On the other hand, the increase in provided information makes it difficult for drivers to determine which of multiple information items should be emergently perceived, and may interfere with driving operations.

There has been proposed a vehicle display that selects, from among multiple images displayed on an electronic instrument panel, an attention image to which a driver should be caused to attend and displays a marker while moving the marker to guide the line of sight of the driver to the attention image, and includes reproduction means capable of reproducing a localized sound corresponding to the moving position of the marker (see Patent Literature 1).

Patent Literature 1: Japanese Patent Application Publication No. 2012-113672 (see paragraphs 0014, 0020, and FIG. 4)

Patent Literature 2: Japanese Patent No. 5930067
Patent Literature 3: Japanese Patent No. 6381736
Patent Literature 4: Japanese Patent No. 6289788

In Patent Literature 1, the line of sight is guided by using the marker displayed on the display, and it takes time for the line of sight to be guided to the intended image. Also, the position of the marker may change every second, and it is difficult to reproduce the localized sound corresponding to the moving position of the marker.

SUMMARY OF THE INVENTION

An information presentation control device of the present invention is an information presentation control device to cause a plurality of displays and a sound output device mounted on a vehicle to present information for driving assistance, and includes: an information analyzer to calculate a degree of risk on a basis of detection information regarding an attention object located around the vehicle; an occupant monitor to determine a state of a driver on a basis of information obtained by detecting a situation in the vehicle; an image processor to cause at least one of the plurality of displays to perform alerting display, on a basis of the degree of risk calculated by the information analyzer; and a sound processor to cause the sound output device to generate an alerting sound, on a basis of the degree of risk calculated by the information analyzer, wherein the sound processor causes a sound whose sound image is controlled so that a virtual sound source is localized at a position of at least one of the at least one display that performs the alerting display, to be generated as the alerting sound, wherein the sound processor controls output of the alerting sound on a basis of the determination by the occupant monitor, wherein the information obtained by detecting the situation in the vehicle includes information obtained by imaging the driver with a camera, wherein the occupant monitor analyzes a direction of a face or a line of sight of the driver and determines whether the driver is aware of approach of the attention object for which the degree of risk has been calculated by the information analyzer, on a basis of the information obtained by imaging the driver with the camera, and wherein when the driver is already aware of the attention object located around the vehicle for which the degree of risk has been calculated by the information analyzer and for which the degree of risk is high, the sound processor stops generation of the alerting sound or decreases a sound volume of the alerting sound.

An information presentation device of the present invention is an information presentation device to cause a plurality of displays and a sound output device mounted on a vehicle to present information for driving assistance, and includes: an external situation detector to detect an attention object located around the vehicle; an internal situation detector to detect a situation in the vehicle and output detection information; and processing circuitry to calculate a degree of risk on a basis of detection information regarding the attention object obtained by detection by the external situation detector, cause at least one of the plurality of displays to perform alerting display, on a basis of the calculated degree of risk, and cause the sound output device to generate an alerting sound, on a basis of the calculated degree of risk, wherein the processing circuitry causes a sound whose sound image is controlled so that a virtual sound source is localized at a position of at least one of the at least one display that performs the alerting display, to be generated as the alerting sound, wherein the internal situation detector includes a camera to image a driver, wherein the processing circuitry controls output of the alerting sound on a basis of the detection information output from the internal situation detector, wherein the detection information output from the internal situation detector includes information obtained by imaging the driver with the camera, wherein the processing circuitry analyzes a direction of a face or a line of sight of the driver and determines whether the driver is aware of approach of the attention object detected by the external situation detector, on a basis of the information obtained by imaging the driver with the camera, and wherein when the driver is already aware of the attention object located around the vehicle that has been detected by the external situation detector and for which the degree of risk is high, the processing circuitry stops generation of the alerting sound or decreases a sound volume of the alerting sound.

With the present invention, it is possible to quickly direct the line of sight of a driver to a display displaying information to be attended to, and quickly provide the driver with information to be perceived.

DETAILED DESCRIPTION OF THE INVENTION

First Embodiment

Figure 1:
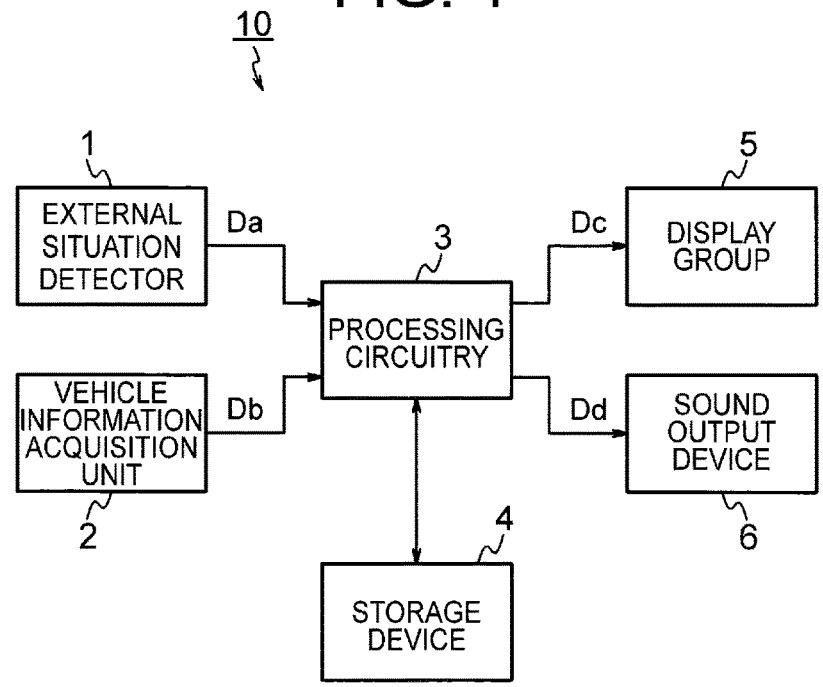
FIG. 1 is a functional block diagram illustrating an example of a configuration of a driving assistance device including an information presentation device of a first embodiment of the present invention.

FIG. 1 illustrates an example of a configuration of a driving assistance device 10 including an information presentation device of a first embodiment of the present invention.

Figure 2:
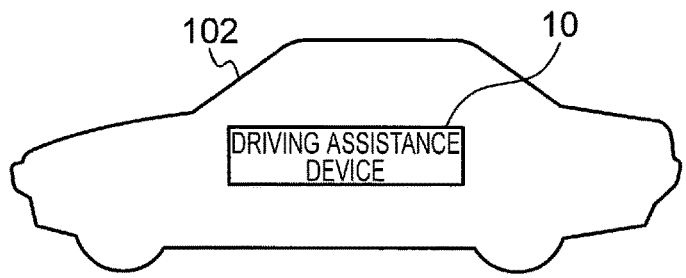
FIG. 2 is a schematic diagram illustrating a vehicle mounted with the driving assistance device illustrated in FIG. 1.

The illustrated driving assistance device 10 is mounted on a vehicle 102, for example, as illustrated in FIG. 2, and includes an external situation detector 1, a vehicle information acquisition unit 2, processing circuitry 3, a display group 5, and a sound output device 6. The external situation detector 1, vehicle information acquisition unit 2, and processing circuitry 3 constitute the information presentation device.

The processing circuitry 3 illustrated in FIG. 1 has a function as a controller of the information presentation device, and is also referred to as an information presentation control device.

Figure 3:
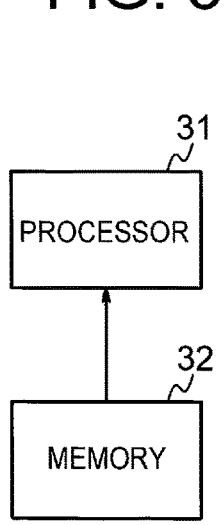
FIG. 3 is a functional block diagram illustrating an example of a configuration of a computer used to implement a function of processing circuitry illustrated in FIG. 1 with software.

While functions of the processing circuitry 3 can be implemented by hardware, they can also be implemented by software, or a programmed computer. FIG. 3 illustrates an example of a configuration of a computer used in the case of implementation by software. The processing circuitry 3 of FIG. 1 is constituted by a processor 31 and a program memory 32 of FIG. 3, and the processor 31 operates as the processing circuitry 3 of FIG. 1 by operating in accordance with a program stored in the program memory 32.

The processing circuitry 3 is connected to a storage device 4.

The storage device 4 may be formed by a hardware drive (HDD), a solid state drive (SSD), or the like. The storage device 4 may be connected to the processing circuitry 3 directly or via a network.

The external situation detector 1 acquires information representing a situation around the vehicle 102, and outputs detection information Da regarding attention objects (or objects to be attended to). The attention objects include other vehicles, persons, and fixed structures located around the vehicle 102. The other vehicles include four-wheel automobiles (such as passenger vehicles, trucks, and buses), two-wheel automobiles, and bicycles. The vehicle 102 with the driving assistance device 10 mounted thereon may be referred to as the "own vehicle" in order to distinguish it from the "other vehicles".

Figure 4:
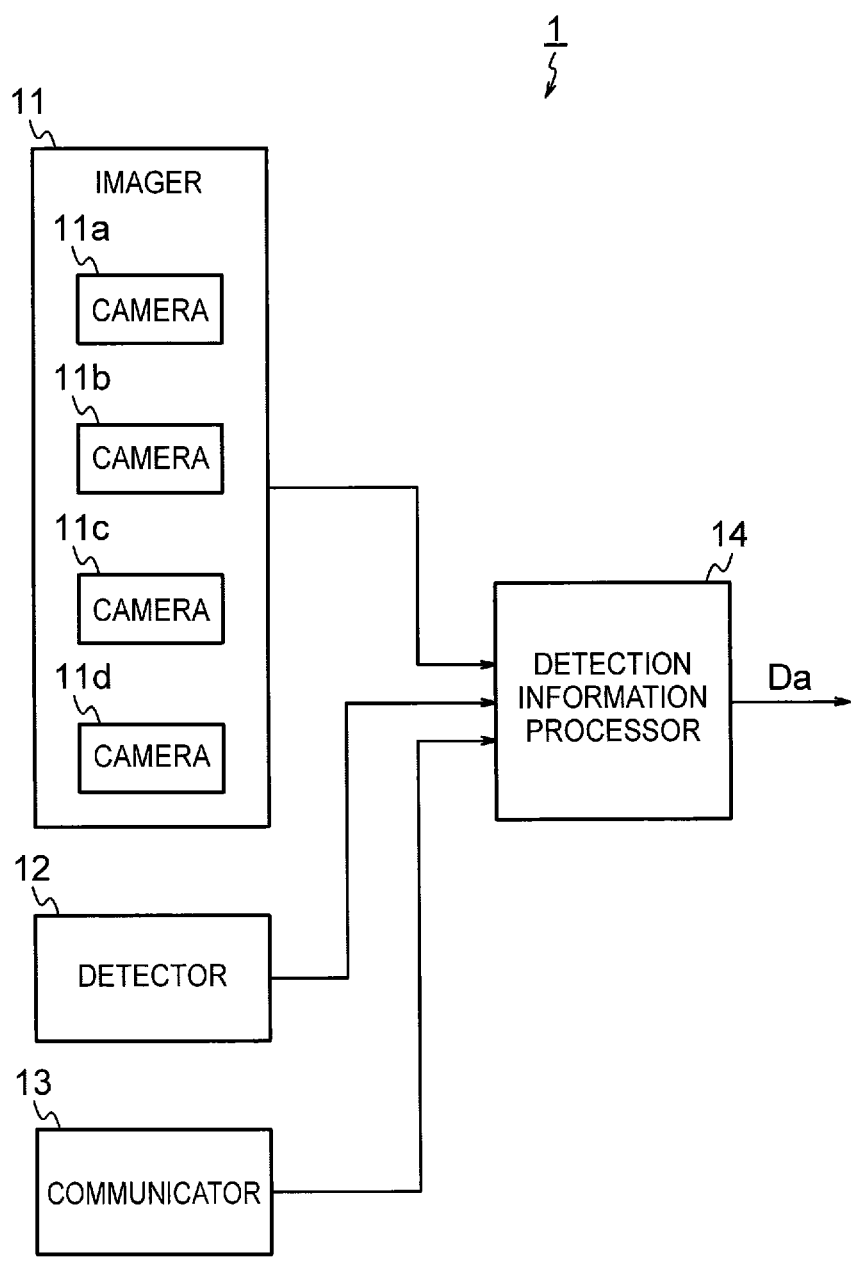
FIG. 4 is a functional block diagram illustrating an example of a configuration of an external situation detector illustrated in FIG. 1.

As illustrated in FIG. 4, the external situation detector 1 includes an imager 11, a detector 12, a communicator 13, and a detection information processor 14.

The imager 11 images an area around the vehicle 102, and outputs an image signal representing an image obtained by the imaging. The imager 11 captures images in different directions around the vehicle 102. The imager 11 includes, for example, multiple cameras that image images in the respective directions.

Figure 5:
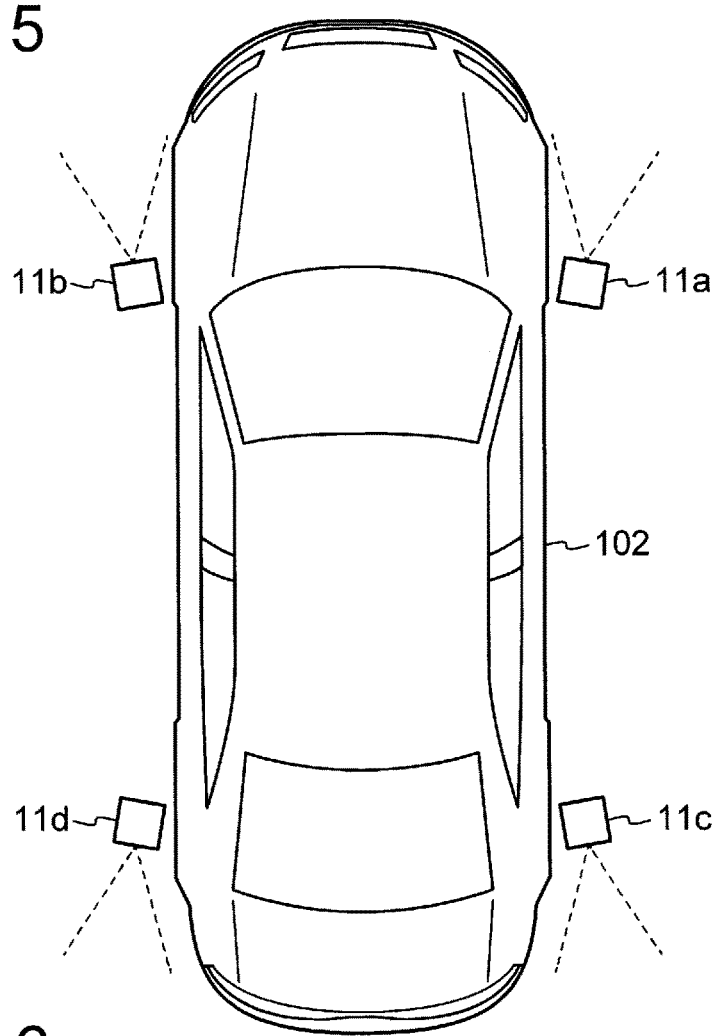
FIG. 5 is a schematic diagram illustrating imaging directions of cameras constituting an imager illustrated in FIG. 4.

For example, as illustrated in FIG. 5, the imager 11 includes a first camera 11a that images an image in front of and to the right of the vehicle 102, a second camera 11b that images an image in front of and to the left of the vehicle 102, a third camera 11c that images an image behind and to the right of the vehicle 102, and a fourth camera 11d that images an image behind and to the left of the vehicle 102.

The detector 12 detects attention objects located around the vehicle 102. The detector 12 may include, for example, one or more of a laser imaging detection and ranging (LIDAR), a millimeter-wave radar, and an ultrasonic sensor. The detector 12 detects attention objects or detects distances to the attention objects.

The communicator 13 receives information regarding other vehicles provided from outside the vehicle 102. The information regarding other vehicles may include information indicating the positions, moving directions, and moving speeds of the other vehicles. The provision from outside the vehicle 102 may be provision by direct communication from the other vehicles, or may be provision by communication via a base station.

The detection information processor 14 generates and outputs detection information Da on the basis of the image signal representing the image obtained by imaging by the imager 11, information obtained by detection by the detector 12, and the information received by the communicator 13.

The detection information Da output from the detection information processor 14 includes information representing an image of the situation around the vehicle 102 and information regarding attention objects located around the vehicle 102. Such information regarding attention objects may include information indicating distances to the attention objects and/or information indicating the positions, moving directions, and moving speeds of the attention objects.

The vehicle information acquisition unit 2 acquires information (own vehicle information) Db regarding the vehicle 102. The own vehicle information Db may include information indicating the position, moving direction, and moving speed of the own vehicle. The information indicating the position, moving direction, and moving speed of the own vehicle may be acquired from a navigation system, for example.

The processing circuitry 3 controls the display group 5 and sound output device 6 on the basis of the detection information Da output from the external situation detector 1 and the own vehicle information Db output from the vehicle information acquisition unit 2. Specifically, it generates an image signal Dc and supplies it to the display group 5 to control images displayed by the display group 5, and generates a sound signal Dd and supplies it to the sound output device 6 to control sound output by the sound output device 6.

The display group 5 is controlled by the processing circuitry 3 to display images. Specifically, the processing circuitry 3 supplies the image signal Dc to the display group 5, and the display group 5 displays images in accordance with the image signal Dc from the processing circuitry 3.

The images displayed by the display group 5 are, for example, images acquired by the external situation detector 1 and subjected to emphasis processing by the processing circuitry 3 as needed.

Figure 6:
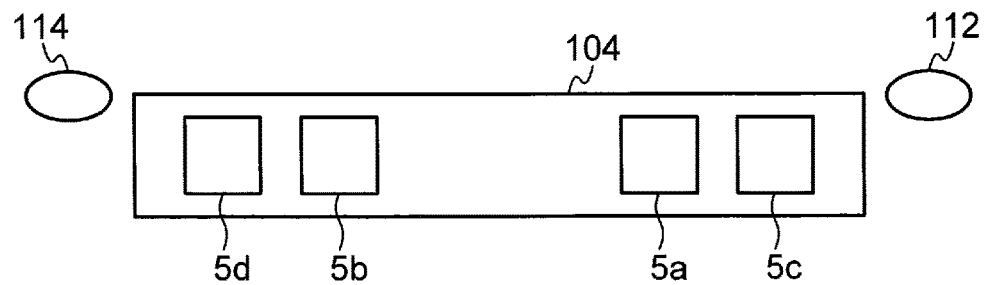
FIG. 6 is a schematic diagram illustrating an example of an arrangement of displays constituting a display group illustrated in FIG. 1.

The display group 5 includes first to fourth displays 5a to 5d provided on a dashboard 104, for example, as illustrated in FIG. 6.

Figure 7:
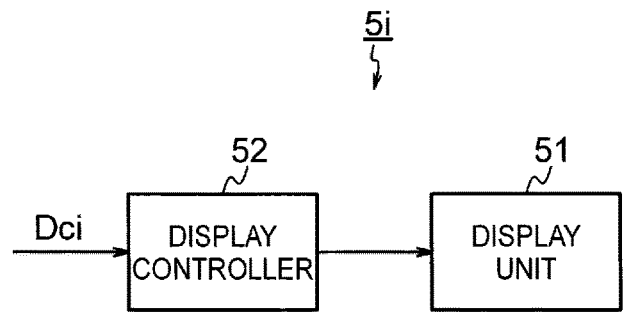
FIG. 7 is a functional block diagram illustrating an example of a configuration of each of the displays illustrated in FIG. 6.

Each (denoted by reference character 5i) of the first to fourth displays 5a to 5d may include a display unit 51 and a display controller 52 that controls display on the display unit 51, for example, as illustrated in FIG. 7.

Of the image signal Dc, an image signal Dci to be displayed by the display unit 51 of a display 5i is supplied to the display controller 52 of the display 5i.

For example, the first display 5a displays an image in front of and to the right of the vehicle 102, the second display 5b displays an image in front of and to the left of the vehicle 102, the third display 5c displays an image behind and to the right of the vehicle 102, and the fourth display 5d displays an image behind and to the left of the vehicle 102.

For example, the first to fourth displays 5a to 5d are provided to correspond to the first to fourth cameras 11a to 11d, and respectively display images obtained by imaging by the first to fourth cameras 11a to 11d.

The first display 5a is preferably located in a direction in which the driver looks in front of and to the right of the vehicle 102 or in a direction close thereto, as viewed from the driver.

The second display 5b is preferably located in a direction in which the driver looks in front of and to the left of the vehicle 102 or in a direction close thereto, as viewed from the driver.

The third display 5c is preferably located in a direction in which the driver looks at a right side mirror 112 or in a direction close thereto, as viewed from the driver. The right side mirror 112 is viewed when the driver checks the situation behind and to the right of the vehicle 102.

The fourth display 5d is preferably located in a direction in which the driver looks at a left side mirror 114 or in a direction close thereto, as viewed from the driver. The left side mirror 114 is viewed when the driver checks the situation behind and to the left of the vehicle 102.

In the example illustrated in FIG. 6, the first to fourth displays 5a to 5d are arranged on the dashboard 104 in the order of the third display 5c, first display 5a, second display 5b, and fourth display 5d, from the right.

The sound output device 6 is controlled by the processing circuitry 3 to output an alerting sound. Specifically, the processing circuitry 3 supplies the sound signal Dd to the sound output device 6, and the sound output device 6 outputs the alerting sound in accordance with the sound signal Dd from the processing circuitry 3.

The alerting sound is to inform which of the first to fourth displays 5a to 5d should be paid attention to. The alerting sound is a sound whose sound image is controlled so that a virtual sound source of the alerting sound is localized at a position of one of the first to fourth displays 5a to 5d, and informs which of the first to fourth displays 5a to 5d should be paid attention to, by the localization of the virtual sound source.

Figure 8:
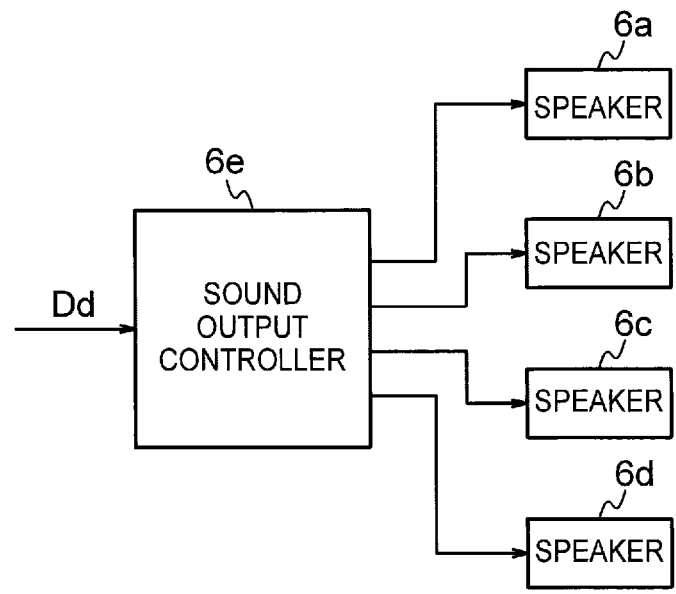
FIG. 8 is a functional block diagram illustrating an example of a configuration of a sound output device illustrated in FIG. 1.

The sound output device 6 may include multiple speakers 6a to 6d and a sound output controller 6e that controls sound output by the speakers 6a to 6d, for example, as illustrated in FIG. 8. The sound output controller 6e here includes an amplifier. The sound output device 6 may be provided separately, or as a separate component, from the displays 5a to 5d.

Figure 9:
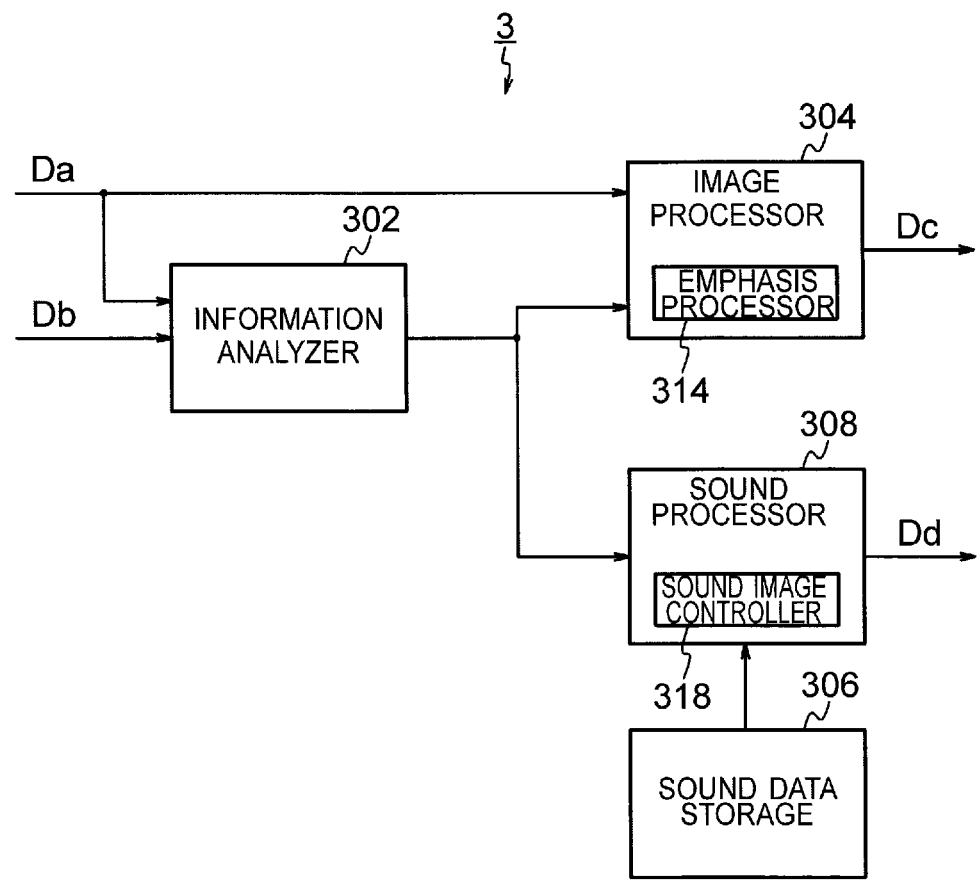
FIG. 9 is a functional block diagram illustrating an example of a configuration of the processing circuitry illustrated in FIG. 1.

FIG. 9 is a functional block diagram illustrating a configuration of the processing circuitry 3 of FIG. 1. The illustrated processing circuitry 3 includes an information analyzer 302, an image processor 304, a sound data storage 306, and a sound processor 308.

The information analyzer 302 acquires the detection information Da from the external situation detector 1.

The information analyzer 302 detects attention objects, such as other vehicles, persons, or structures, located around the vehicle 102, on the basis of the detection information Da from the external situation detector 1. Here, description will be made on the assumption that only one attention object has been detected.

As a method of detecting attention objects located around the vehicle 102, for example, any of the following methods may be used:

(a1) a method using an image, e.g., the method disclosed in Patent Literature 2 (Japanese Patent No. 5930067);

(a2) a method based on a result of detection by a LIDAR, e.g., the method disclosed in Patent Literature 3 (Japanese Patent No. 6381736); and (a3) a method based on a result of detection by an ultrasonic sensor, e.g., the method disclosed in Patent Literature 4 (Japanese Patent No. 6289788).

The information analyzer 302 calculates a degree of risk from the detection information Da regarding the attention object and information regarding the own vehicle.

In the calculation of the degree of risk, for example, it is possible to determine, from the position, moving direction, and moving speed of the attention object and the position, moving direction, and moving speed of the own vehicle, the time to collision on the assumption that the own vehicle continues to travel as it is (without the own vehicle changing the moving direction and moving speed), and calculate, as the degree of risk, the inverse of the determined time. When the attention object or own vehicle is about to change the moving direction, this may be taken into account. When the attention object is a fixed structure, it is possible to calculate the degree of risk from the position, moving direction, and moving speed of the own vehicle while taking the moving speed of the attention object to be zero.

When the detection information Da from the external situation detector 1 includes information indicating the position, moving direction, and moving speed of the attention object, the position, moving direction, and moving speed of the attention object indicated by the information may be used in the calculation of the degree of risk.

When the detection information Da from the external situation detector 1 does not include information indicating the position, moving direction, and moving speed of the attention object, the position, moving direction, and moving speed of the attention object may be calculated on the basis of information included in the detection information Da. For example, when the detection information Da includes a distance to the attention object and an image including the attention object, the position, moving direction, and moving speed of the attention object may be calculated on the basis of them.

As the position, moving direction, and moving speed of the own vehicle for the calculation of the degree of risk, those indicated by the own vehicle information Db from the vehicle information acquisition unit 2 may be used.

When the degree of risk calculated for the attention object is not less than a threshold, the information analyzer 302 also determines that the driver should be alerted, and selects a display to perform alerting display.

In the selection of the display, it is possible to select a display that is displaying an image including the detected attention object.

The information analyzer 302 supplies information indicating the selected display to the image processor 304 and sound processor 308.

The image processor 304 supplies the images obtained by imaging by the cameras 11a to 11d of the imager 11 to the respective corresponding displays 5a to 5d. The image processor 304 includes an emphasis processor 314.

The emphasis processor 314 performs emphasis processing on the image displayed by the selected display. The emphasis processing is processing for highlighting the attention object for which the degree of risk of collision has been determined to be not less than the threshold. As a method of the emphasis processing, for example, any of the following methods may be used:

(b1) enclosing the attention object with a colored line; and
(b2) blurring or erasing the image except for the attention object.

The image subjected to the emphasis processing by the emphasis processor 314 is supplied to the selected display. Thereby, the alerting display is performed by the selected display.

The sound processor 308 causes the sound output device 6 to generate an alerting sound. The sound processor 308 receives sound data from the sound data storage 306 and causes a sound represented by the sound data to be output as the alerting sound.

The sound processor 308 includes a sound image controller 318. The sound image controller 318 causes a sound whose sound image is controlled so that a virtual sound source is localized at a position of the display that performs the alerting display, to be generated as the alerting sound. The sound processor 308 performs, on the sound data, signal processing for generating the sound whose sound image is controlled.

The sound data may be any one that alerts the driver. As the sound data, for example, data representing one of the following sounds may be used:

(c1) a pure tone (a sound represented by a single sine wave);
(c2) a human voice (a voice message);
(c3) a dissonance (a sound that is perceived as noise); and
(c4) a sound effect.

Also, as a method of the sound image control, for example, any of the following methods may be used:

(d1) an amplitude panning process using two speakers with the selected display therebetween;
(d2) a crosstalk cancellation process using multiple speakers; and
(d3) wave field synthesis using multiple speakers.

A process for information presentation by the processing circuitry 3 will be described below with reference to the flowchart of FIG. 10.

In step ST11, the information analyzer 302 performs detection of an attention object by using the detection information Da output from the external situation detector 1.

In step ST12, the information analyzer 302 acquires information regarding the attention object detected in step ST11.

In step ST13, the information analyzer 302 acquires information regarding the own vehicle from the vehicle information acquisition unit 2.

The processes of steps ST12 and ST13 can be performed in parallel.

Subsequent to steps ST12 and ST13, in step ST14, the information analyzer 302 calculates the degree of risk for the attention object, from the information regarding the attention object and the information regarding the own vehicle.

In step ST15, the information analyzer 302 determines whether the degree of risk is higher than a predetermined threshold.

When it is determined to be higher than the threshold, it is determined that the alerting display should be performed, and information indicating the determination is output (ST16). The information indicating the determination that the alerting display should be performed is output as an alerting flag, for example.

When the alerting flag is output, in step ST17, the information analyzer 302 selects a display to perform the alerting display, and informs the image processor 304 and sound processor 308 of the selected display.

As the display to perform the alerting display, a display that is displaying an image including the attention object for which the degree of risk has been determined to be higher than the threshold is selected.

Subsequent to step ST17, the processes of steps ST18 and ST19 are performed.

In step ST18, the emphasis processor 314 of the image processor 304 performs the emphasis processing on an image displayed by the selected display, on the basis of the information generated in step ST16 and information indicating the selection in step ST17.

In step ST19, the sound image controller 318 of the sound processor 308 performs the signal processing for controlling the sound image so that a virtual sound source is localized at a position of the selected display, on the basis of the information generated in step ST16 and the information indicating the selection in step ST17.

The image subjected to the emphasis processing is displayed by the selected display, and a sound resulting from the signal processing is reproduced by the sound output device 6.

Figure 11:
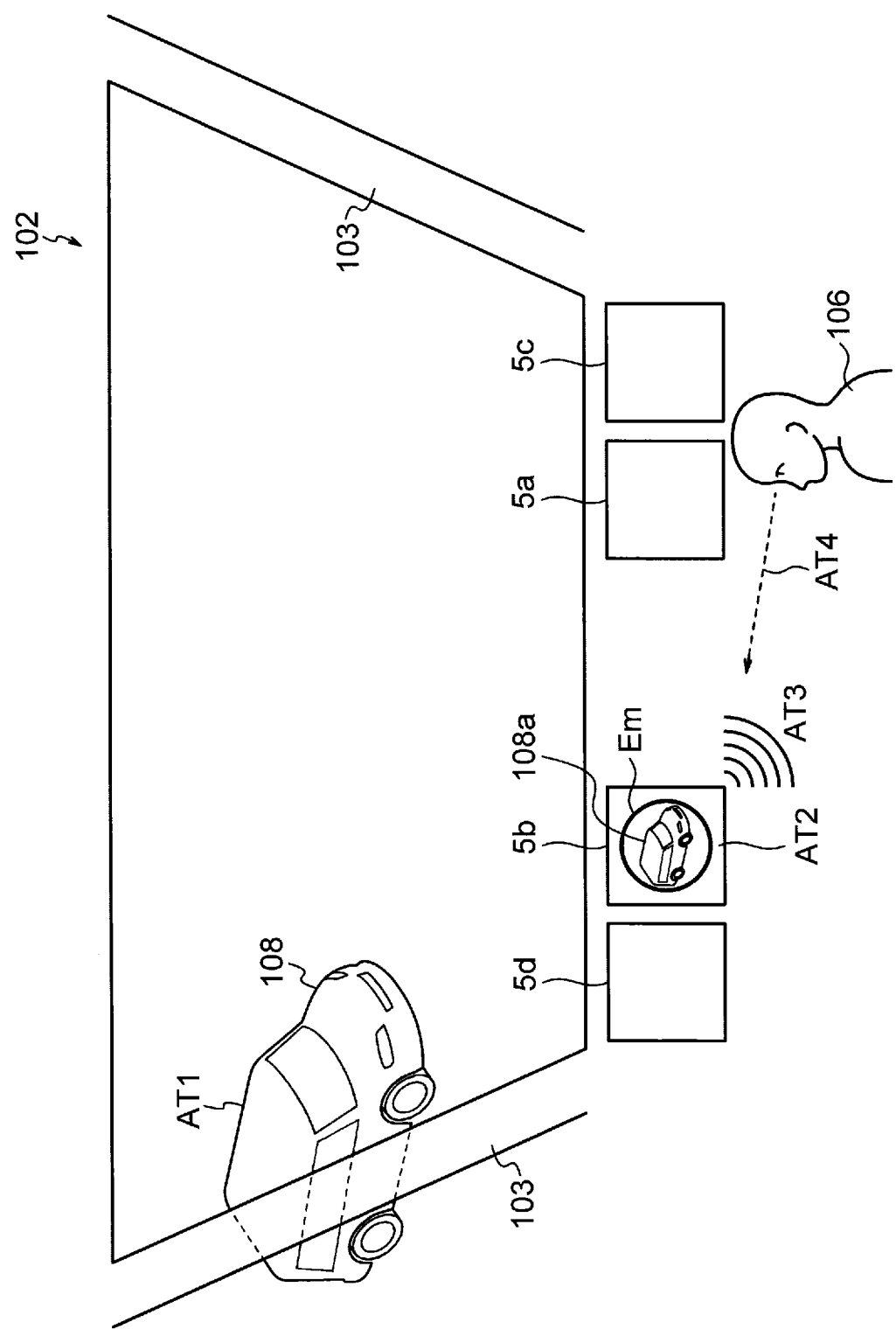
FIG. 11 is a diagram conceptually illustrating an example of an operation of the information presentation device illustrated in FIG. 1.

FIG. 11 conceptually illustrates an example of operation when the above process is performed.

For example, when there is an approaching vehicle 108 ahead and to the left (AT1) and it is determined that the degree of risk of collision of the vehicle 108 with the own vehicle 102 is not less than the threshold, the display 5b, which displays a forward left image, is selected from among the displays in the vehicle, an approaching vehicle 108a in the image displayed by the selected display 5b is emphasized (AT2), and simultaneously, an alerting sound having a sound image with a virtual sound source localized at a position of the display 5b is generated (AT3).

In response to the alerting sound, a driver 106 looks at the display 5b, which is located at the position of the virtual sound source (AT4).

In the image displayed on the display 5b, the approaching vehicle 108a is enclosed by a line Em for emphasis, and the driver looking thereat can quickly perceive the approaching vehicle 108a.

The driver perceives the approaching vehicle 108a displayed on the display 5b in this manner, and thus also perceives the actual approaching vehicle 108, and can take driving actions (such as braking or turning a steering wheel) for collision avoidance.

Such a process of information presentation is especially effective, for example, when the approaching vehicle 108 is in a blind spot of the driver, e.g., when it is hidden behind a pillar 103 of the own vehicle 102. This is because, while an attention object located in a blind spot of the driver is difficult to perceive under direct vision and tends to be perceived late, indicating the display 5b to be paid attention to by means of the alerting sound helps the driver 106 to look at the display 5b and perceive the approaching vehicle 108b subjected to the emphasis processing (AT2).

The emphasis processing may be omitted. Even in this case, indicating the display to be paid attention to by means of the alerting sound helps the driver to look at the display and perceive the displayed approaching vehicle.

Although in the above example, the first to fourth displays 5a to 5d always display the images obtained by imaging by the first to fourth cameras, it is also possible to perform image display only when it is determined in step ST15 that the degree of risk is higher than the threshold.

In this case, it is possible to perform display of an imaged image with a display located in a direction in which the attention object is located (a direction in which it is viewed from the driver), the direction closest to this direction, a direction in which a mirror reflecting the attention object is located, or the direction closest to this direction.

For example, when it is determined that the degree of risk for an attention object located ahead and slightly to the right is higher than the threshold, image display is performed with the display 5a, which is located ahead and to the right.

Likewise, when it is determined that the degree of risk for an attention object located behind and slightly to the right is higher than the threshold, image display is performed with the display 5c, which is located in the direction closest to a direction in which the right side mirror 112 (reflecting the attention object located behind and to the right) is located (a direction in which it is viewed from the driver).

Figure 12:
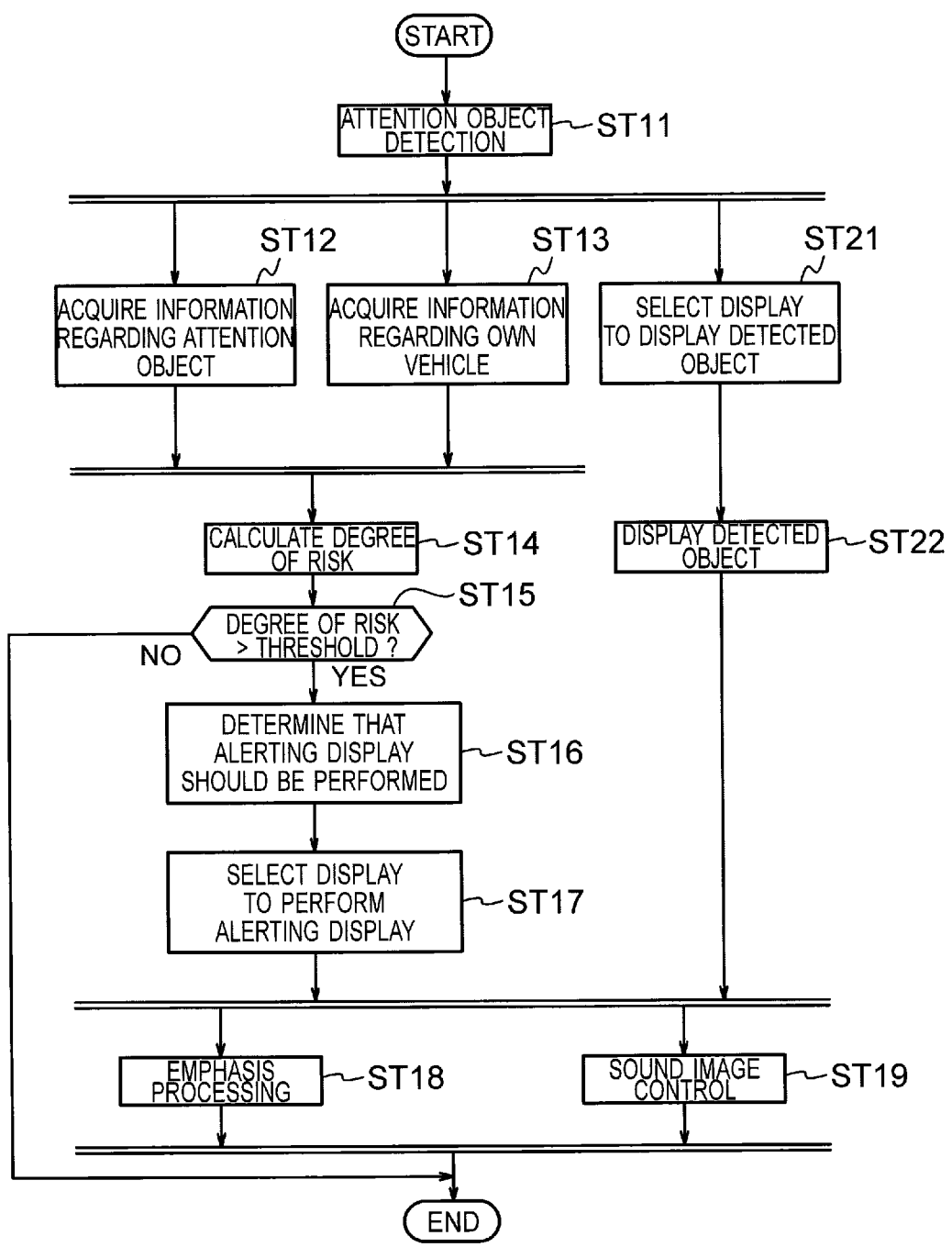
FIG. 12 is a flowchart illustrating another example of the operation of the processing circuitry illustrated in FIG. 9.

It is also possible that the display is normally not performed, and when an attention object is detected in step ST11, display of an image of the attention object is started. FIG. 12 illustrates a procedure of a process in this case.

Figure 10:
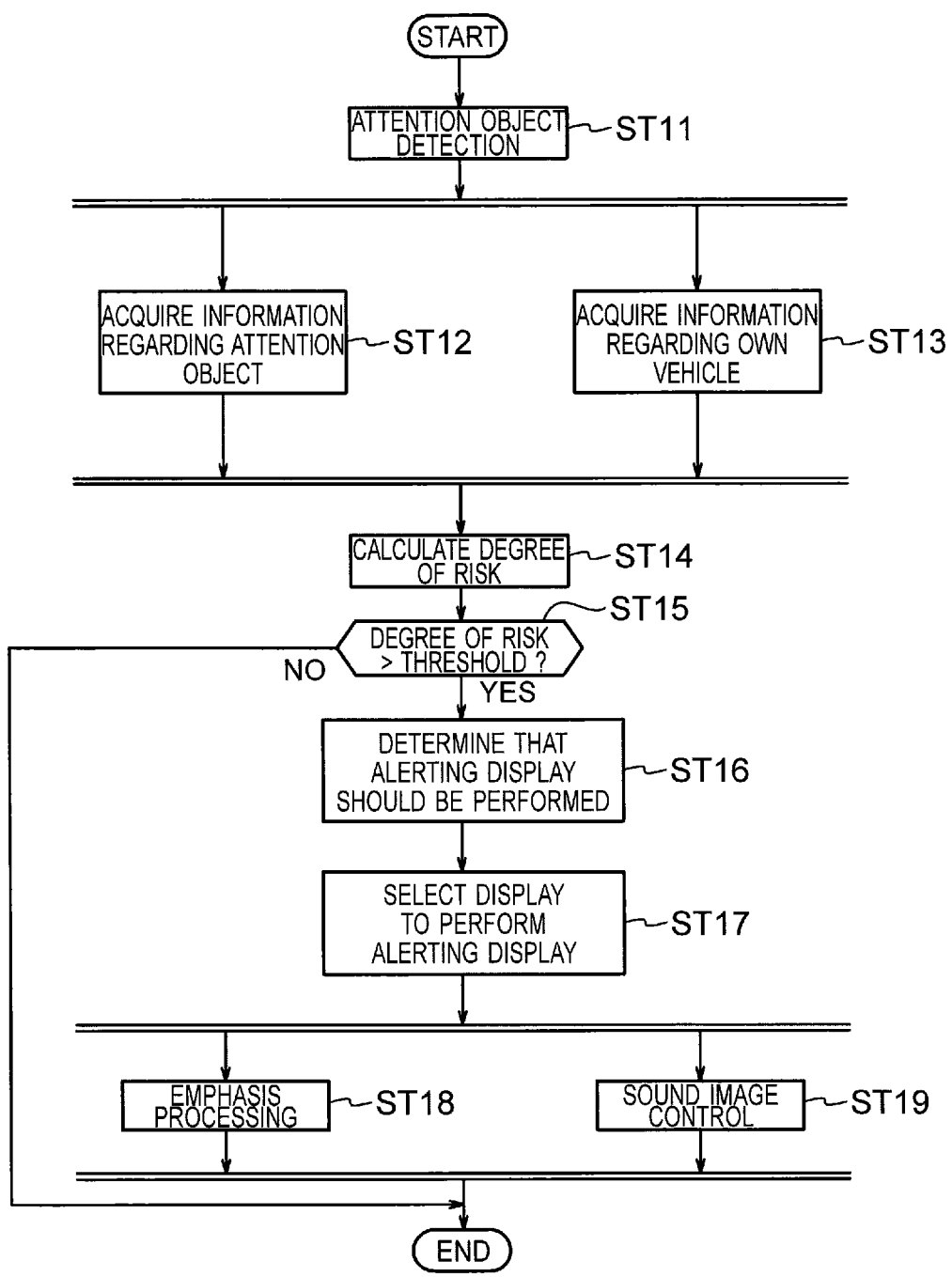
FIG. 10 is a flowchart illustrating an example of an operation of the processing circuitry illustrated in FIG. 9.

While FIG. 12 is generally the same as FIG. 10, it additionally includes steps ST21 and ST22.

In step ST21, on the basis of a result of the detection of an attention object, the information analyzer 302 selects a display to display the detected object and informs the image processor 304 of the selected display.

The selection of the display in this case may be made so that an imaged image is displayed with a display located in a direction in which the detected attention object is located (a direction in which it is viewed from the driver), the direction closest to this direction, a direction in which a mirror reflecting the attention object is located, or the direction closest to this direction, similarly to the above.

For example, when an attention object is detected ahead and slightly to the right, the display 5a, which is located ahead and to the right, is selected. Similarly, when an attention object is detected behind and slightly to the right, the display 5c, which is located in the direction closest to a direction in which the right side mirror 112 (reflecting the attention object located behind and to the right) is located (a direction in which it is viewed from the driver), is selected.

In step ST22, the image processor 304 starts to display an image of the detected object.

In such a configuration, the displays 5a to 5d may normally display other images. For example, a display of a navigation system may be used as one of the displays 5a to 5d.

In the above configuration, the external situation detector 1 includes the first to fourth cameras 11a to 11d that image images in different directions, and the first to fourth displays 5a to 5d respectively correspond to the first to fourth cameras 11a to 11d and respectively display images obtained by imaging by the corresponding cameras 11a to 11d.

Alternatively, the image displayed by each of the displays 5a to 5d may display an image viewed in a direction different from the imaging directions of the cameras. For example, when an image in front of and to the right of the vehicle 102 is displayed with the first display 5a, without using a camera that images an image in the same direction, the forward right image may be generated from images obtained by imaging by multiple cameras that image images in different directions.

For example, the forward right image may be generated by combining an image obtained by imaging by a camera that images a forward image and an image obtained by imaging by a camera that images a right image.

In short, the external situation detector 1 may be any one that generates images in multiple different directions displayed by the first to fourth displays 5a to 5d.

In this case, it may be configured to generate images in desired directions by combining images obtained by imaging by multiple cameras in the detection information processor 14. The displays need not necessarily correspond to cameras on a one-to-one basis. Also, the number of cameras need not necessarily be equal to the number of displays.

Second Embodiment

Figure 13:
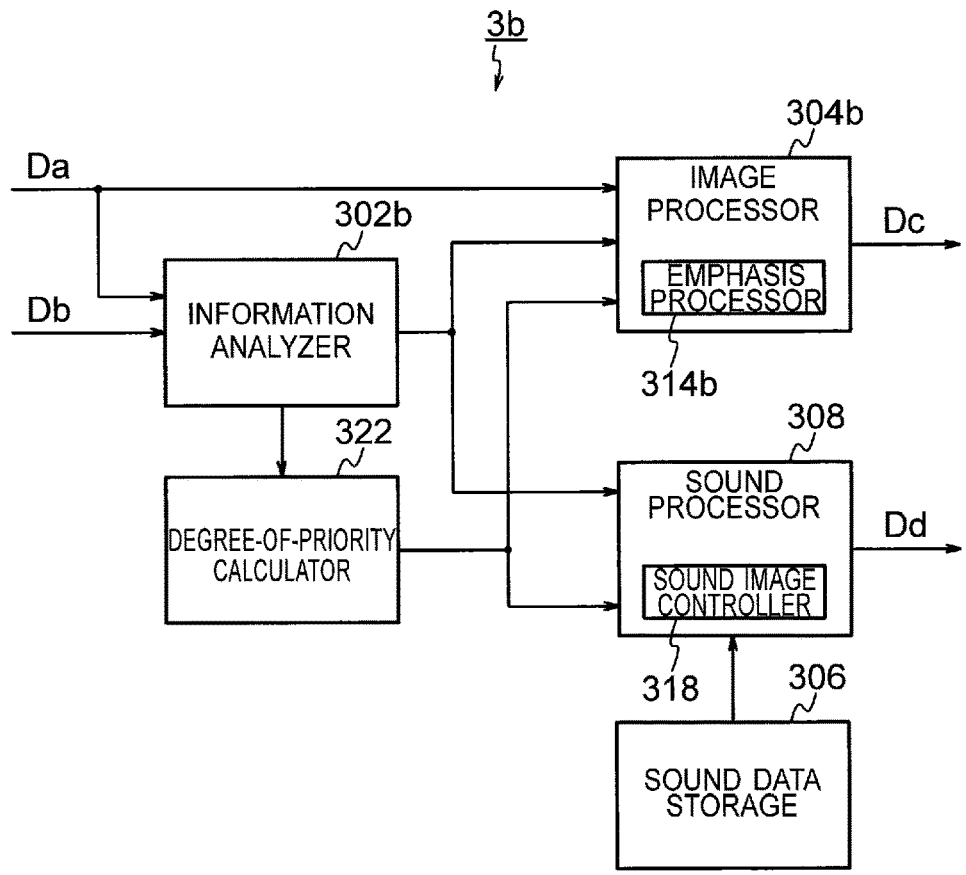
FIG. 13 is a functional block diagram illustrating a configuration of processing circuitry used in a second embodiment of the present invention.

FIG. 13 is a functional block diagram illustrating a configuration of processing circuitry 3b used in a second embodiment of the present invention.

Although the processing circuitry 3*b* illustrated in FIG. 13 is generally the same as the processing circuitry 3 illustrated in FIG. 9, it additionally includes a degree-of-priority determiner 322. Also, an information analyzer 302*b* is provided instead of the information analyzer 302, and an image processor 304*b* is provided instead of the image processor 304.

When the information analyzer 302*b* detects multiple attention objects, it calculates a degree of risk for each attention object.

When the information analyzer 302*b* calculates the degrees of risk for the multiple attention objects, the degree-of-priority determiner 322 assigns degrees of priority on the basis of the calculated degrees of risk. As the degrees of priority, higher degrees of priority are assigned to attention objects that should be perceived by the driver more quickly.

As a method of assigning the degrees of priority, for example, any of the following methods may be used:

(e1) increasing the degree of priority as the degree of risk calculated by the information analyzer 302 increases; and (e2) previously assigning degrees of priority (orders of priority) to types (vehicles, persons, and structures) of attention objects.

The degree-of-priority determiner 322 informs the image processor 304*b* of the determined degrees of priority, and informs the sound processor 308 of information indicating a display having the highest of the determined degrees of priority.

An emphasis processor 314*b* of the image processor 304*b* performs emphasis processing of the attention objects on the basis of the degrees of priority of which the image processor 304*b* has been informed.

As a method of the emphasis processing based on the degrees of priority, for example, any of the following methods may be used:

(f1) performing emphasis processing only for a display that is displaying an image including the attention object having the highest degree of priority; and (f2) performing emphasis display on all of the display(s) that are displaying image(s) including the attention objects, but performing different emphases depending on the degrees of priority.

As the different emphases depending on the degrees of priority, it is conceivable to enclose the attention objects in the image(s) with lines having different colors or thicknesses. In this case, it is conceivable to enclose attention objects having higher degrees of priority with lines having more prominent colors or greater thicknesses.

The sound image controller 318 of the sound processor 308 performs sound image control on the basis of the information indicating the display having the highest degree of priority of which the sound processor 308 has been informed. Specifically, it performs sound image control so that a virtual sound source is localized at a position of the display having the highest degree of priority.

Advantages provided by this embodiment will be described. When multiple attention objects are detected around the own vehicle, different emphasis displays are performed depending on the degrees of priority. This makes it easier to perceive which of the multiple displays should be preferentially paid attention to, and makes it possible for the driver to quickly take appropriate driving actions.

Also, the sound image is controlled so that a virtual sound source is localized at a position of the display having the highest degree of priority. This makes it easy to perceive which display should be first paid attention to, and makes it possible to quickly take actions in response to the imminent risk.

Third Embodiment

Figure 14:
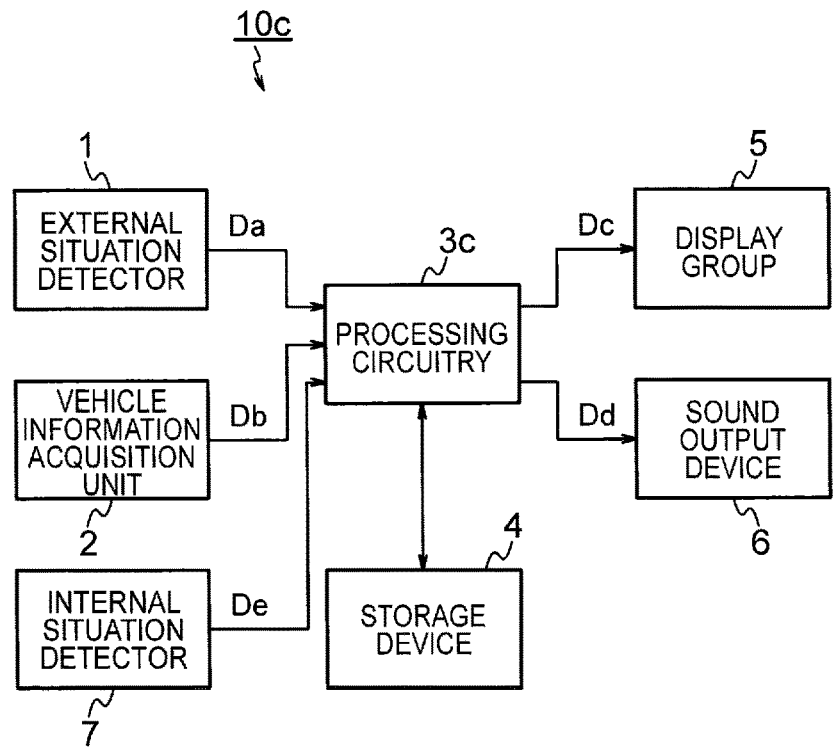
FIG. 14 is a functional block diagram illustrating an example of a configuration of a driving assistance device including an information presentation device of a third embodiment of the present invention.

FIG. 14 illustrates an example of a configuration of a driving assistance device 10*c* including an information presentation device of a third embodiment of the present invention.

Although the driving assistance device 10*c* illustrated in FIG. 14 is generally the same as the driving assistance device 10 illustrated in FIG. 1, it additionally includes an internal situation detector 7 and is provided with processing circuitry 3*c* instead of the processing circuitry 3.

Figure 15:
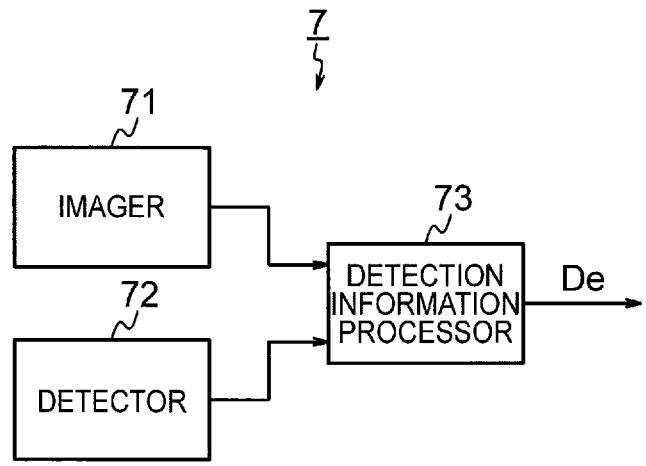
FIG. 15 is a functional block diagram illustrating an example of a configuration of an internal situation detector illustrated in FIG. 14.

The internal situation detector 7 includes, as illustrated in FIG. 15, an imager 71, a detector 72, and a detection information processor 73.

The imager 71 includes one or more cameras. The cameras image one or more occupants in the vehicle. The occupants include a driver and other occupants (fellow passengers).

The detector 72 detects the states of one or more occupants in the vehicle. The detector 72 may include a physiological sensor or a voice detector (microphone). The physiological sensor may detect the heart rate of an occupant, e.g., a driver. The voice detector may be any one that detects voice produced by an occupant.

The detection information processor 73 supplies information obtained by imaging by the imager 71 and information obtained by detection by the detector 72, as detection information De, to the processing circuitry 3*c*.

Figure 16:
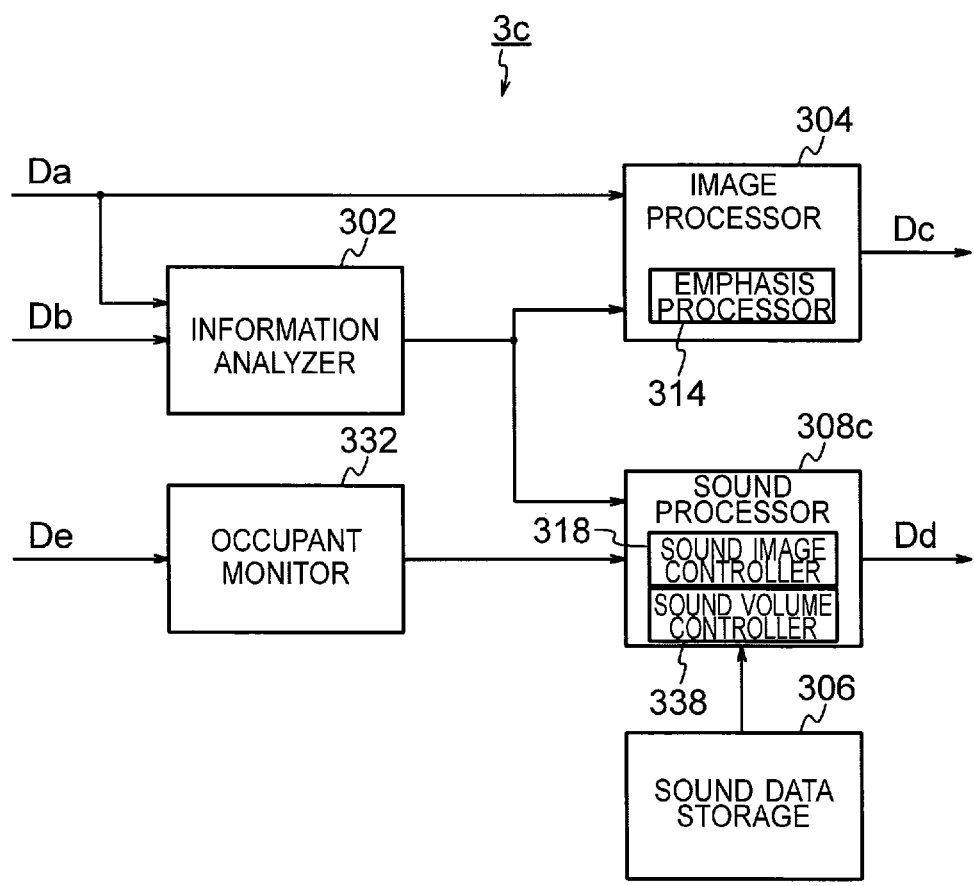
FIG. 16 is a functional block diagram illustrating an example of a configuration of processing circuitry illustrated in FIG. 14.

FIG. 16 illustrates an example of a configuration of the processing circuitry 3*c* of FIG. 14.

Although the processing circuitry 3*c* of FIG. 16 is generally the same as the processing circuitry 3 of FIG. 9, it additionally includes an occupant monitor 332 and is provided with a sound processor 308*c* instead of the sound processor 308.

The occupant monitor 332 may be what is commonly referred to as a driver monitoring system (DMS). The occupant monitor 332 determines the states of one or more occupants from the detection information De obtained by detection by the internal situation detector 7.

As a method of determining the state of an occupant, for example, any of the following methods may be used:

(g1) analyzing the direction of the face or the line of sight of an occupant by using an in-vehicle camera, and determining whether the occupant is aware of an attention object approaching;

(g2) measuring the degree of attention of a driver to driving by detecting the heart rate by using a physiological sensor; and (g3) when an occupant other than a driver is aware of a risk and informing the driver of the risk by utterance or gesture, detecting this.

Although the sound processor 308*c* is generally the same as the sound processor 308 of FIG. 9, it additionally includes a sound volume controller 338. The sound volume controller 338 controls the sound volume of the alerting sound, on the basis of the states of the one or more occupants in the own vehicle determined by the occupant monitor 332.

The sound processor 308*c* causes the sound output device 6 to generate sound at the sound volume controlled by the sound volume controller 338.

The sound volume controller 338 performs, for example, one of the following sound volume controls:

(h1) when a driver is already aware of an attention object having a high degree of risk located around the vehicle 102, stopping generation of the alerting sound or decreasing the sound volume of the alerting sound;

(h2) when an occupant other than a driver is aware of an attention object having a high degree of risk located around the vehicle 102 and is informing the driver of the risk, detecting this and stopping generation of the alerting sound or decreasing the sound volume of the alerting sound; and (h3) when the attention of a driver is low, increasing the sound volume.

In the above example, the sound processor 308c includes the sound volume controller 338 and controls the sound volume depending on the states of one or more occupants. Alternatively, it is possible that the sound image controller 318 performs the sound image control so that the position at which a virtual sound source is localized is changed. For example, instead of the process of (h3), it is possible to perform (h4) when the attention of a driver is low, controlling the sound image of the alerting sound so that a virtual sound source is localized at an ear of the driver.

In short, when the attention of a driver is low, the sound processor 308c may perform control so that the degree of alerting by the alerting sound to the driver is increased.

Advantages provided by this embodiment will be described.

Although the alerting sound is for conveying information necessary for occupants (especially, a driver), it may discomfort the occupants.

Thus, when it is determined, from the states of one or more occupants, that there is no need to generate the alerting sound, by stopping or reducing the sound, it is possible to prevent the occupants from being discomforted.

Also, when the attention of the driver is low, by increasing the sound volume or controlling the sound image so that a virtual sound source is localized at an ear, it is possible to increase the degree of alerting and cause the degree of risk to be quickly perceived.

Although in the first to third embodiments, the detection information processor 14 has been described to be part of the external situation detector 1, it may be part of the processing circuitry 3. In this case, the function of the detection information processor 14 may be implemented by software, or the programmed computer illustrated in FIG. 3.

Although in the third embodiment, the detection information processor 73 has been described to be part of the internal situation detector 7, it may be part of the processing circuitry 3c. In this case, the function of the detection information processor 73 may be implemented by software, or the programmed computer illustrated in FIG. 3.

Although the information presentation devices and information presentation control devices according to the present invention have been described above, the information presentation methods implemented by the information presentation devices and the information presentation control methods implemented by the information presentation control devices are also part of the present invention. In addition, programs for causing computers to execute processes of these devices or methods and computer-readable recording media storing such programs are also part of the present invention.

DESCRIPTION OF REFERENCE CHARACTERS

1 external situation detector, 2 vehicle information acquisition unit, 3, 3b, 3c processing circuitry, 4 storage device, 5 display group, 5a to 5d display, 6 sound output device, 6a to 6d speaker, 6e sound output controller, 7 internal situation detector, 10 information presentation device, 11 imager, 11a to 11d camera, 12 detector, 13 communicator, 14 detection information processor, 31 processor, 32 program memory, 51 display unit, 52 display controller, 71 imager, 72 detector, 73 detection information processor, 102 vehicle, 104 dashboard, 106 driver, 112 side mirror, 114 side mirror, 302, 302b information analyzer, 304, 304b image processor, 306 sound data storage, 308, 308b, 308c sound processor, 314 emphasis processor, 318 sound image controller, 322 degree-of-priority determiner, 332 occupant monitor, 338 sound volume controller.

What is claimed is:

1. An information presentation control device to cause a plurality of displays and a sound output device mounted on a vehicle to present information for driving assistance, the information presentation control device comprising:

an information analyzer to calculate a degree of risk on a basis of detection information regarding an attention object located around the vehicle;

an occupant monitor to determine a state of a driver on a basis of information obtained by, detecting a situation in the vehicle;

an image processor to cause at least one of the plurality of displays to perform alerting display, on a basis of the degree of risk calculated by the information analyzer; and a sound processor to cause the sound output device to generate an alerting sound, on a basis of the degree of risk calculated by the information analyzer, wherein the sound processor causes a sound whose sound image is controlled so that a virtual sound source is localized at a position of at least one of the at least one display that performs the alerting display, to be generated as the alerting sound, wherein the sound processor controls output of the alerting sound on a basis of the determination by the occupant monitor, wherein the information obtained by detecting the situation in the vehicle includes information obtained by imaging the driver with a camera, wherein the occupant monitor analyzes a direction of a face or a line of sight of the driver and determines whether the driver is aware of approach of the attention object for which the degree of risk has been calculated by the information analyzer, on a basis of the information obtained by imaging the driver with the camera, and wherein when the driver is already aware of the attention object located around the vehicle for which the degree of risk has been calculated by the information analyzer and for which the degree of risk is high, the sound processor stops generation of the alerting sound or decreases a sound volume of the alerting sound.

2. The information presentation control device of claim 1, wherein the degree of risk is a degree of risk of collision of the vehicle with the attention object.

3. The information presentation control device of claim 1, wherein the image processor causes display of an image that is obtained by imaging an area around the vehicle and in which an attention object for which the degree of risk is high is emphasized, to be performed as the alerting display.

4. The information presentation control device of claim 1, wherein when the information analyzer detects a plurality of attention objects having high degrees of risk around the vehicle, the information analyzer determines a degree of priority for each of the plurality of attention objects having high degrees of risk, and the image processor causes the at least one display to display one or more images including the plurality of attention objects having high degrees of risk, and causes the at least one display to perform, for each attention object, alerting display depending on the degree of priority.

5. The information presentation control device of claim 4, wherein the sound processor causes a sound whose sound image is controlled so that a virtual sound source is localized at a position of one of the at least one display that performs the alerting display and that displays one of the images including the detected object having the highest degree of priority, to be generated as the alerting sound.

6. The information presentation control device of claim 1, wherein the information presentation control device is configured so that when the image processor causes one of the plurality of displays to perform the alerting display, the sound processor causes a sound whose sound image is controlled so that the sound has a single virtual sound source that is localized at a position of the one of the plurality of displays that performs the alerting display, to be generated as the alerting sound.

7. An information presentation device to cause a plurality of displays and a sound output device mounted on a vehicle to present information for driving assistance, the information presentation device comprising:
  an external situation detector to detect an attention object located around the vehicle;
  an internal situation detector to detect a situation in the vehicle and output detection information; and
  processing circuitry to calculate a degree of risk on a basis of detection information regarding the attention object obtained by detection by the external situation detector, cause at least one of the plurality of displays to perform alerting display, on a basis of the calculated degree of risk, and cause the sound output device to generate an alerting sound, on a basis of the calculated degree of risk,
  wherein the processing circuitry causes a sound whose sound image is controlled so that a virtual sound source is localized at a position of at least one of the at least one display that performs the alerting display, to be generated as the alerting sound,
  wherein the internal situation detector includes a camera to image a driver,
  wherein the processing circuitry controls output of the alerting sound on a basis of the detection information output from the internal situation detector,
  wherein the detection information output from the internal situation detector includes information obtained by imaging the driver with the camera,
  wherein the processing circuitry analyzes a direction of a face or a line of sight of the driver and determines whether the driver is aware of approach of the attention object detected by the external situation detector, on a basis of the information obtained by imaging the driver with the camera, and
  wherein when the driver is already aware of the attention object located around the vehicle that has been detected by the external situation detector and for which the degree of risk is high, the processing circuitry stops generation of the alerting sound or decreases a sound volume of the alerting sound.

8. The information presentation device of claim 7, wherein the external situation detector includes one or more cameras to image an area around the vehicle.

9. The information presentation device of claim 8, wherein each of the plurality of displays includes a display unit and a display controller to control display by the display unit.

10. The information presentation device of claim 8, wherein the sound output device includes a plurality of speakers and a sound output controller to control output of sound by the plurality of speakers.

11. The information presentation device of claim 8, wherein the processing circuitry causes display of an image that is obtained by imaging by the cameras and in which an attention object having a high risk of collision with the vehicle is emphasized, to be performed as the alerting display.

12. The information presentation device of claim 11, wherein each of the plurality of displays includes a display unit and a display controller to control display by the display unit.

13. The information presentation device of claim 11, wherein the sound output device includes a plurality of speakers and a sound output controller to control output of sound by the plurality of speakers.

14. The information presentation device of claim 7, wherein each of the plurality of displays includes a display unit and a display controller to control display by the display unit.

15. The information presentation device of claim 7, wherein the sound output device includes a plurality of speakers and a sound output controller to control output of sound by the plurality of speakers.

16. The information presentation device of claim 7, wherein the sound output device includes a plurality of speakers provided separately from the displays.

17. The information presentation device of claim 7, wherein the information presentation device is configured so that when the processing circuitry causes one of the plurality of displays to perform the alerting display, the processing circuitry causes a sound whose sound image is controlled so that the sound has a single virtual sound source that is localized at a position of the one of the plurality of displays that performs the alerting display, to be generated as the alerting sound.

18. An information presentation control method to cause a plurality of displays and a sound output device mounted on a vehicle to present information for driving assistance, the information presentation control method comprising:
  calculating a degree of risk on a basis of detection information regarding an attention object located around the vehicle;
  determining a state of a driver on a basis of information obtained by detecting a situation in the vehicle;
  causing at least one of the plurality of displays to perform alerting display, on a basis of the calculated degree of risk; and
  causing the sound output device to generate an alerting sound, on a basis of the calculated degree of risk,
  wherein a sound whose sound image is controlled so that a virtual sound source is localized at a position of at least one of the at least one display that performs the alerting display is generated as the alerting sound,
  wherein output of the alerting sound is controlled on a basis of the determination of the state of the driver, wherein the information obtained by detecting the situation in the vehicle includes information obtained by imaging the driver with a camera, wherein the information presentation control method further comprises:

analyzing a direction of a face or a line of sight of the driver and determining whether the driver is aware of approach of the attention object for which the degree of risk has been calculated, on a basis of the information obtained by imaging the driver with the camera; and when the driver is already aware of the attention object located around the vehicle for which the degree of risk has been calculated and for which the degree of risk is high, stopping generation of the alerting sound or decreasing a sound volume of the alerting sound.

19. A non-transitory computer-readable recording medium storing a program for causing a computer to execute a process of the information presentation control method of claim 18.

20. The information presentation control method of claim 18, wherein when one of the plurality of displays is caused to perform the alerting display, a sound whose sound image is controlled so that the sound has a single virtual sound source that is localized at a position of the one of the plurality of displays that performs the alerting display is generated as the alerting sound.

* * * * *